United States Patent [19]

McLandrich

[11] 4,290,697

[45] Sep. 22, 1981

[54] METHOD TO ELIMINATE FIBER INTERFEROMETER REFLECTIONS

[75] Inventor: Matthew N. McLandrich, Carlsbad, Calif.

[73] Assignee: The United States of America as represented by the Secretary of the Navy, Washington, D.C.

[21] Appl. No.: 60,943

[22] Filed: Jul. 26, 1979

[51] Int. Cl.$^3$ .............................................. G01C 19/64
[52] U.S. Cl. .................................................... 356/350
[58] Field of Search ................................ 356/350, 351

[56] References Cited

U.S. PATENT DOCUMENTS 3,395,270  7/1968  Speller ............................... 356/350

Primary Examiner—Vincent P. McGraw

Attorney, Agent, or Firm—R. S. Sciascia; Ervin F. Johnston; Thomas G. Keough

[57] ABSTRACT

Improved performance in a fiber interferometer gyro results from eliminating signals attributed to unwanted reflections from the fiber ends and the coupling lenses. A coiled single-mode fiber bidirectionally transmits beams radiating from a continuous wave laser to a detector. A fixed frequency oscillator amplitude modulates the laser output and provides a reference signal at the same frequency to enable synchronous detection of the detector output signals. Shifting the reference signal $\pi/2$ radians from the modulating signal eliminates the detector output signals which are attributed to reflections from the fiber ends and coupling lenses. By properly selecting the modulating frequency and reference phase, the information validity of beam signals passing through the coiled single-mode fiber is enhanced.

5 Claims, 3 Drawing Figures

METHOD TO ELIMINATE FIBER INTERFEROMETER REFLECTIONS

BACKGROUND OF THE INVENTION

A recent development that improves the capabilities of inertial systems which stabilize aircraft, missiles, torpedoes, etc. is the fiber interferometer gyro. This is a relatively rugged, reliable and long-term accurate device in which applied rotation rates cause changes in the output intensity of the interferometer. Detection of these changes gives a measure of the rotation rate. One of the first disclosures of such a gyro was by Vali and R. W. Shorthill as "Fiber Laser Gyroscopes" at the East Coast Conference of SPIE in Reston, Virginia on March 22 and 23, 1976.

The essential elements of the Vali et al., fiber interferometer gyro are schematically depicted in FIG. 1 as prior art although the Vali et al., gyro applied a pair of beamsplitters and associated detectors and coupling lenses. The output of a continuous wave laser is divided by a beamsplitter into two beams which circulate in opposite directions in a long, multiple turn, single-mode fiber. The beams exit the fiber and are recombined at the beamsplitter. Their interference pattern is translated by a photodetector into an electronic signal representative of the applied rotation rate.

However, in addition to the beams transmitted through the coiled single-mode fiber, beams are reflected from the fiber ends and from the input/output coupling lenses. These reflected beams also are translated at the photodetector and can interfere with the desired signals (those indicative of rotation rate) and cause erroneous indications of the measurements of the rotation rate.

Schemes for elimination of these reflections mostly have followed two methods. The first, shown as prior art in FIG. 2 of the drawings, employs special antireflection coated lenses and beamsplitters. The fiber ends are polished or cleaved at an angle to deflect the reflected beams along a path which is not coincident with the optical axis of the fiber interferometer. The alternative method calls for the immersion of the entire optical component in a bath of an index matching liquid. The index matching liquid eliminates a variety of reflections since the objectionable reflections occur only at interfaces between media of different refractive indices.

Both of these methods have disadvantages. Both are costly and complex to implement. Generally speaking, shaping the ends degrades the optical surfaces and decreases the gyro signal quality. Grinding and polishing fiber ends at an angle while maintaining a good optical quality surface requires involved fabrication procedures which must be done by skilled techniques. Even when highly skilled technicians and sophisticated equipment are employed and the best fabrication methods are followed, the resulting surfaces generally have scratches and pits making the cleaved fiber end approach unsatisfactory. Immersion of the interferometer in an index matching liquid is not a practical method suitable for a gyro's operational environment. In such an environment there are usually large temperature variations and possible severe mechanical vibrations. These effects introduce variations in the refractive index of the liquid and cause intensity fluctuations with consequent gyro output signal errors.

Thus, there is a continuing need in the state-of-the-art for an apparatus and method for reducing the reflection signals from fiber ends and coupling lenses which is consistent with the rugged, reliable and uncomplicated system of the fiber interferometer gyro.

SUMMARY OF THE INVENTION

The present invention is directed to providing an improved fiber interferometer gyro and operational method that eliminates the reflections caused by laser beams striking the ends of a coiled single-mode fiber and the input/output coupling optics. An oscillator modulates the laser output and provides a reference signal at the same frequency to enable synchronous detection of the detector output signals.

It is a prime object of the invention to improve the performance of the fiber interferometer gyro.

Another object is to provide an apparatus and method for eliminating the reflections in a fiber interferometer gyro.

Another object is to provide an apparatus and method which is consistent with the favorable features of a fiber interferometer gyro for assuring improved performance.

Still another object of the invention is to provide a lock-in amplifier circuit operatively connected to a laser and a detector to improve a fiber interferometer gyro's performance.

Yet another object of the invention is to provide a rugged, lightweight device consistent with a fiber interferometer's parameters for further improving performance.

Still a further object of the invention is to provide a method and apparatus for improving a fiber interferometer's performance which maximizes the clockwise and counterclockwise beams passing through a coiled single-mode fiber.

Yet another object is to provide a fiber interferometer gyro which enhances an information signal's content.

An ultimate object is to provide a fiber interferometer gyro employing electronic signal processing methods to improve rotation rate resolution.

These and other objects of the invention will become more readily apparent from the ensuing specification when taken with the accompanying drawings.

DESCRIPTION OF THE PREFERRED EMBODIMENT

Figure 1:
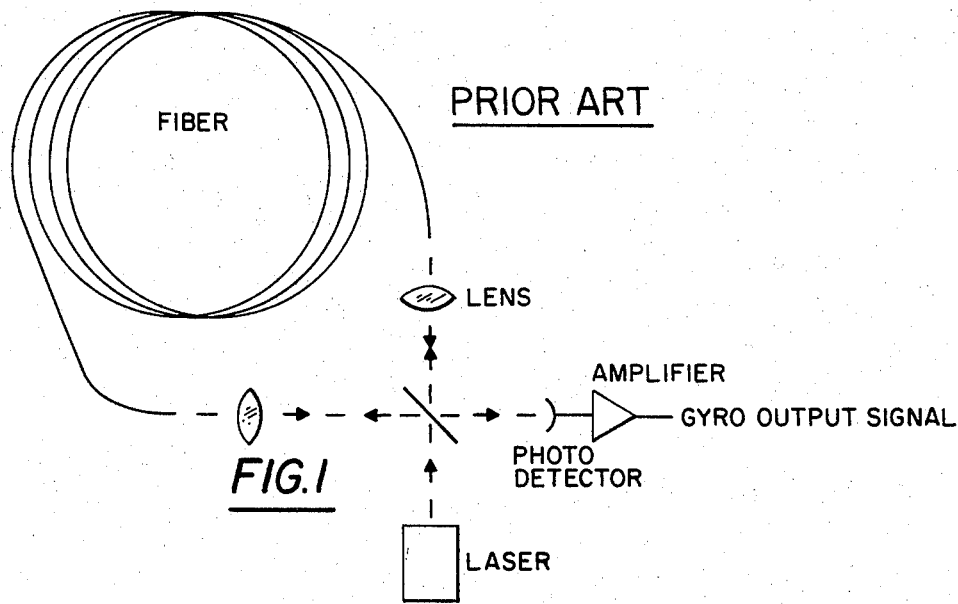
FIG. 1 depicts a typical fiber interferometer gyro.
Figure 2:
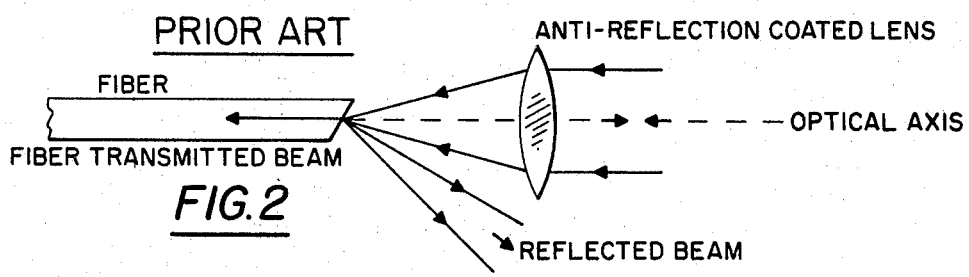
FIG. 2 shows one way in which unwanted reflections are eliminated in a fiber interferometer gyro.
Figure 3:
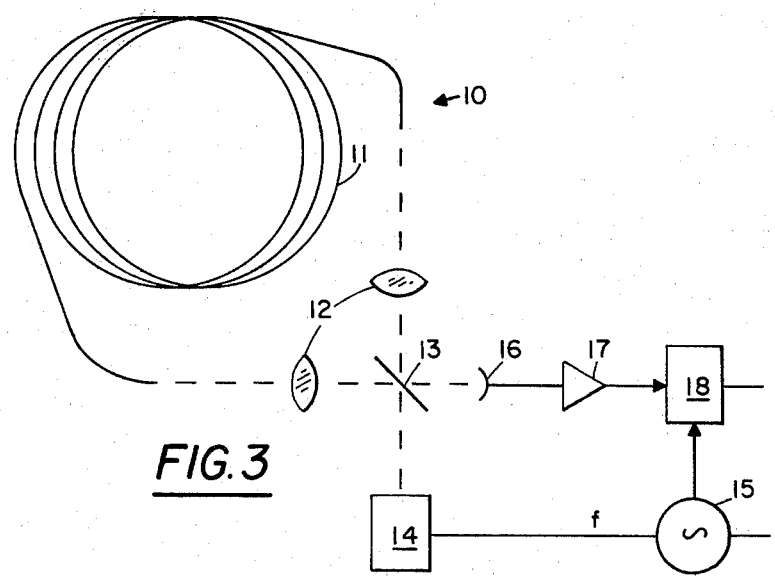
FIG. 3 sets forth in schematic form the principal constituents of the inventive concept.

Referring once again to FIG. 3 in the drawings, the apparatus and new method to eliminate fiber interferometer reflections employs electronic signal processing devices and methods. A fiber interferometer gyro 10 has a single-mode fiber 11 looped or coiled on itself. The length of the fiber can be in the order of a few kilometers long to assure suitable sensitivity for low rotation rates.

A pair of coupling lenses 12 and a beamsplitter 13 assure that beams of light from a continuous wave laser 14 are split into clockwise and counterclockwise beams in a coiled single-mode fiber. These bidirectionally traveling beams assure that interference patterns will be generated and monitored in a manner as set out below.

The output of the continuous wave laser is modulated at a frequency f by an oscillator 15. The modulated beams of light are coupled into the interferometer via the beamsplitter and coupling lenses. Reflections from the interferometer optics including the beamsplitter and lenses and from the fiber ends will arrive at a photodetector 16 at a time T=0 while the clockwise and counterclockwise beams traveling through single-mode fiber 11 will be delayed by time nL/c where L is the fiber length, n is the fiber index of refraction and c is the speed of light.

This time delay results in a signal phase difference of $2\pi fnL/c$ between the unwanted reflections from the interferometer optics and the fiber ends and the desired interferometer information output beams.

As the beams impinge on the photodetector, they are transformed into representative signals which are preamplified in a preamplifier 17. The amplified signals are fed from the preamp to a special type of phase sensitive synchronous detector, a lock-in amplifier 18.

Lock-in amplifiers of the type employed in the present invention are well known and well established in the art. The Princeton Applied Research Corporation of Princeton, New Jersey, has a widely used selection of commercially available lock-in amplifiers which could be selected for the electronic signal processing to be discussed. In its simpliest form, the lock-in amplifier can be no more than a mixer circuit followed by a low pass filter.

This arrangement is phase sensitive when the signal of interest is synchronized with a reference signal in both frequency and phase. If the signal of interest is shifted in phase with respect to the reference signal, it may not appear at the output and if it does appear, it may be of lesser amplitude or of the opposite polarity. In this manner, the lock-in amplifier filters out inputs which do not have the same frequency and phase as that of a reference signal input to the lock-in.

This reference signal is derived from the modulating frequency f at the oscillator 15; this is the same source used to modulate the laser output with the modulating frequency f.

The lock-in amplifier 18 includes a phase control to enable the selection of the proper reference phase. The output of the lock-in amplifier is a dc voltage which is proportional to the signal amplitude at the reference frequency and to the cosine of the phase difference of the reference frequency and the signal coming from preamp 17.

To eliminate the signals attributed to the reflections from the coupling lenses and fiber ends, it is only necessary to select a reference phase of $\pi/2$. Since the reflection signals have a phase of zero relative to the laser modulation's signal f, the output of the lock-in corresponding to the reflectors will be proportional to cosine $(0-\pi)$ which equals 0.

While by the proper selection of the reference phase in the lock-in amplifier, it is possible to eliminate the reflection signals, also it is desirable to maximize the fiber transmitted beam signals which are representative of a rotation rate of the interferometer. This is accomplished by choosing a modulation frequency f so that the phase of this signal is equal to the reference phase, that is $(2\pi fln/c)=\pi/2$. Having these conditions satisfied, the output of the lock-in amplifier corresponding to the desired interferometer output beam will be proportional to cosine $(\pi/2-\pi/2)$ which equals 1.

By the foregoing apparatus and method, readouts due to reflections from the coupling lenses and the fiber ends are eliminated. The information signals from the gyro are maximized by choosing a reference signal phase $\pi/2$ and a modulation frequency f which is equal to $c/4nL$. The apparatus and method of reflection elimination have the advantages of simplier implementation, reduced cost, and better gyro performance. The use of purely electronic signal processing methods to eliminate reflection signals enhances the rotation rate indication. This involves the use of an output modulated laser and a phase sensitive detection system.

Obviously, many other modifications and variations of the present invention are possible in the light of the above teachings. Specifically, other types of lasers (e.g. gas) and modulators other than direct diode current modulation can be used. It is therefore to be understood that within the scope of the inventive concept the invention may be practiced otherwise than as specifically described.

What is claimed is:

1. In a fiber interferometer gyro having a looped single-mode fiber coupled to bidirectionally transmit beams of light from a laser to a detector, an improvement therfor is provided comprising:
    means disposed external the light beam paths and coupled to the laser and the detector for amplitude modulating the laser output and synchronously detecting the detector output with a reference signal of the same frequency as the amplitude modulating signal $\pi/2$ phase shifted with respect to the amplitude modulating signal to eliminate gyro reflections attributed to fiber ends and coupling lenses.

2. An improvement according to claim 1 in which the modulating and synchronously detecting means includes a fixed frequency oscillator which amplitude modulates the laser beams and which provides a reference signal to a lock-in amplifier which shifts the reference signal $\pi/2$ and is suitably adjusted to minimize an output signal when reflection signals are received and maximize signals representative of rotation rate of the interferometer.

3. A method of eliminating reflection signals in a fiber interferometer gyro having a looped single-mode fiber coupled to bidirectionally transmit beams of light from a laser to a detector comprising:
    amplitude modulating the laser output and synchronously detecting the detector output with a phase shifted reference signal coming from a common signal source to eliminate gyro reflections attributed to fiber ends and coupling lenses.

4. A method according to claim 3 further including:
    controlling the phase separation between the signal modulating the laser and the signal enabling the synchronous detection in the detector to have a relative phase difference of $\pi/2$ to eliminate the gyro reflections attributed to fiber ends and coupling lenses.

5. A method according to claim 4 further including:
    adjusting the signal source to have a frequency so that $2\pi fnL/c=\pi/2$ to enhance the information contents of signals transmitted through the looped single-mode fiber.

* * * * *